(12) United States Patent
Levesque et al.

(10) Patent No.: US 6,278,830 B1
(45) Date of Patent: Aug. 21, 2001

(54) BEND LIMITING FIBER MANAGEMENT CLIP

(75) Inventors: Stewart A. Levesque, Scotland; Samuel E. Watrous, Ledyard, both of CT (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 09/481,882

(22) Filed: Jan. 12, 2000

(51) Int. Cl.⁷ ........................................ G02B 6/00
(52) U.S. Cl. .............................. 385/136; 385/135
(58) Field of Search ..................... 385/134–139, 385/92

(56) References Cited

U.S. PATENT DOCUMENTS

| | | |
|---|---|---|
| 2,545,744 | 3/1951 | Nell . |
| 3,689,868 | 9/1972 | Snyder . |
| 3,815,842 | 6/1974 | Scrogin . |
| 4,527,722 | 7/1985 | Strachan . |
| 4,739,945 | 4/1988 | Yokoe . |
| 4,886,336 | 12/1989 | Deusser et al. . |
| 4,900,121 | 2/1990 | Becker et al. . |
| 5,127,082 | * 6/1992 | Below et al. ............... 385/135 |
| 5,412,751 | * 5/1995 | Siemon et al. ............. 385/135 |
| 5,421,532 | 6/1995 | Richter . |
| 5,497,444 | * 3/1996 | Wheeler .................... 385/135 |
| 5,535,298 | * 7/1996 | Fasnacht et al. ........... 385/135 |
| 5,724,469 | 3/1998 | Orlando . |
| 5,737,475 | 4/1998 | Regester . |
| 5,836,537 | 11/1998 | Glass . |
| 6,021,919 | * 3/2001 | Puetz et al. ............... 385/135 |

\* cited by examiner

Primary Examiner—Hemang Sanghavi

(57) ABSTRACT

A bend limiting fiber management clip for mounting on a panel has generally rectangular top and bottom walls, and a pillar extending between the top and bottom walls and arcuately between diagonal corners of the walls. Convexly arcuate retaining arms extend upwardly from the bottom wall to adjacent the top wall at the other diagonal corners of the walls, and a depending boss is provided on the bottom wall which seats in a cooperating aperture of a panel. The top wall may have an aperture cooperatively dimensioned with said boss in which the boss of a second clip may be engaged, and the arcuate retaining arms have outwardly inclined projections at the upper ends thereof extending upwardly from the top wall. Four clips are mounted in a rectangular array, and cables may be wound about the outer surface of the pillars or about the inner surface.

11 Claims, 5 Drawing Sheets

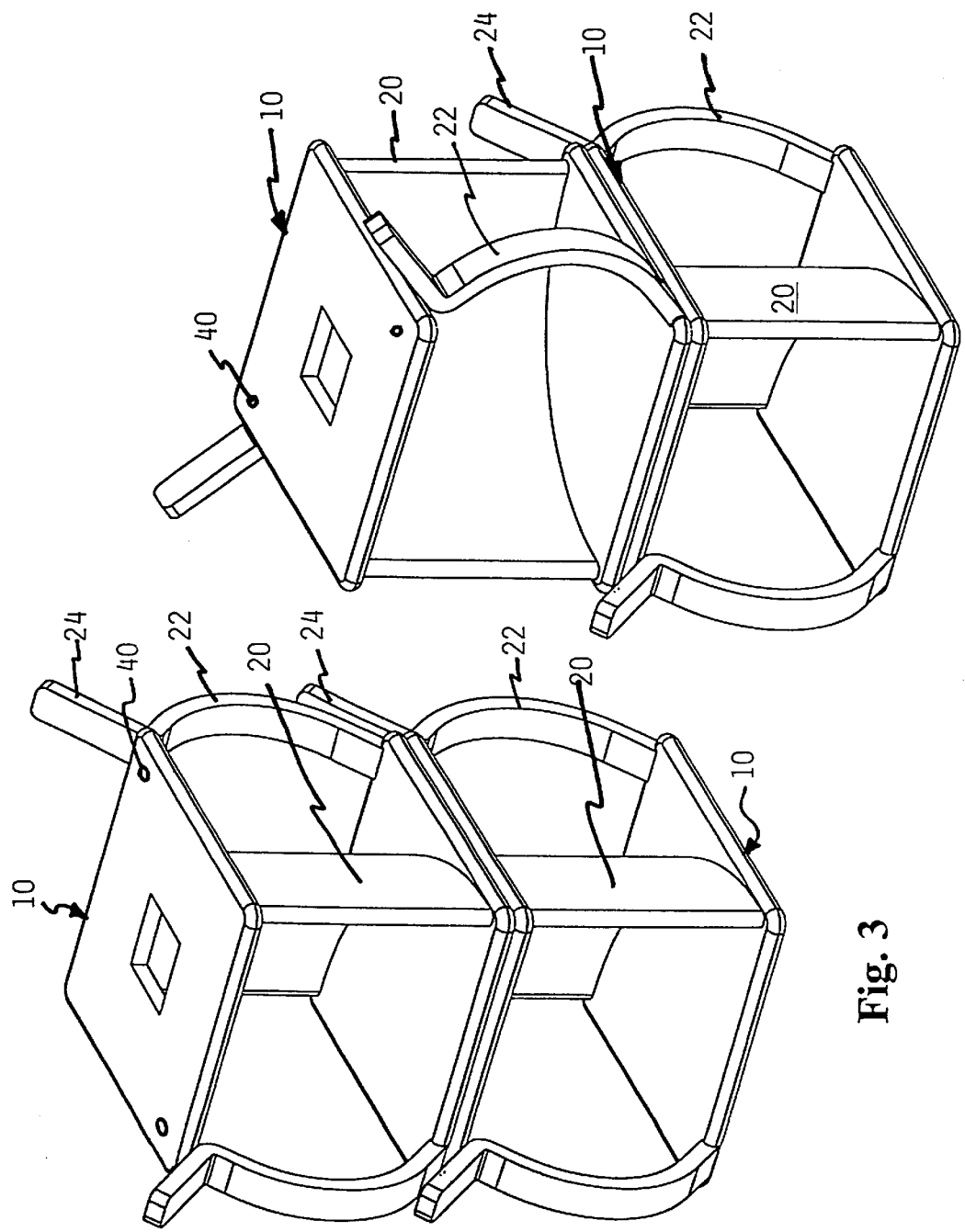

BEND LIMITING FIBER MANAGEMENT CLIP

BACKGROUND OF THE INVENTION

The present invention relates to fiber and wire management in telecommunication systems and, more particularly, to panel assemblies for maintaining excess cable and wire in a coiled condition.

In telecommunication systems, long lengths of cable and wire may be employed between points. To avoid having to replace an entire length of cable or wire in the event of a break or other failure in the cable or wire at one of the end points, it is generally desirable to provide extra cable or wire of about 1–3 meters in length, and this excess is coiled and stored within the housing or elsewhere adjacent the terminating device.

Indicative of the types of panel structures which have been employed for this purpose are those shown in Smith et al U.S. Pat. No. 4,850,901, Deusser et al U.S. Pat. No. 4,886,336, Devilla U.S. Pat. No. 4,976,510, Richter et al U.S. Pat. No. 5,421,532, Orlando U.S. Pat. No. 5,724,469 and Regester U.S. Pat. No. 5,737,475. Generally, such structures have required a fixed structure about which the cable or wire is coiled, were limited to coiling a single cable about the supporting structure and did not afford the ability to vary the circumference of the coil.

It is an object of the present invention to provide a novel bend limiting fiber management clip which can be easily assembled on panels or other substrates so as to avoid excessive bending of the fiber or wire wound thereabout.

It is also an object to provide such a clip which can be readily and economically fabricated.

Another object is to provide such a fiber management clip which can be utilized to provide fiber management structures in which the circumference of the coil may be varied and in which multiple cables can be coiled.

A further object is to provide bend limiting fiber and wire installations utilizing such clips.

SUMMARY OF THE INVENTION

It has now been found that the foregoing and related objects may be readily attained by use of a bend limiting fiber management clip having generally rectangular top and bottom walls, a pillar extending between the top and bottom walls and arcuately between diagonal corners of the walls, convexly arcuate retaining arms extending upwardly from the bottom wall to adjacent the top wall at the other diagonal corners of the walls, a depending boss on the bottom wall which is engageable in an aperture or recess in a panel.

Preferably, the top wall has an aperture cooperatively dimensioned with the boss whereby the boss of a second clip may be engaged in the aperture, and the aperture and boss are disposed centrally of their respective walls. The arcuate retainer arms have projections at the upper ends thereof extending upwardly from the top wall, and the arcuate retainer arms are deflectable outwardly from their point of connection to the bottom wall.

A bending limiting fiber installation utilizes four clips in combination with a panel having spaced apertures therein. Four bend limiting fiber management clips are mounted on the substrate in a rectangular pattern with the arcuate pillars facing diagonally outwardly at the corners of the rectangular pattern to define four arcs of an imaginary closed curve.

BRIEF DESCRIPTION OF THE DRAWINGS

FIG. 3 is a perspective view of a stacked pair of fiber management clips;

FIG. 4 is a perspective view of a stacked pair wherein the upper clip is rotated 90° from the position seen in FIG. 3;

DETAILED DESCRIPTION OF THE PREFERRED EMBODIMENTS

Figure 1:
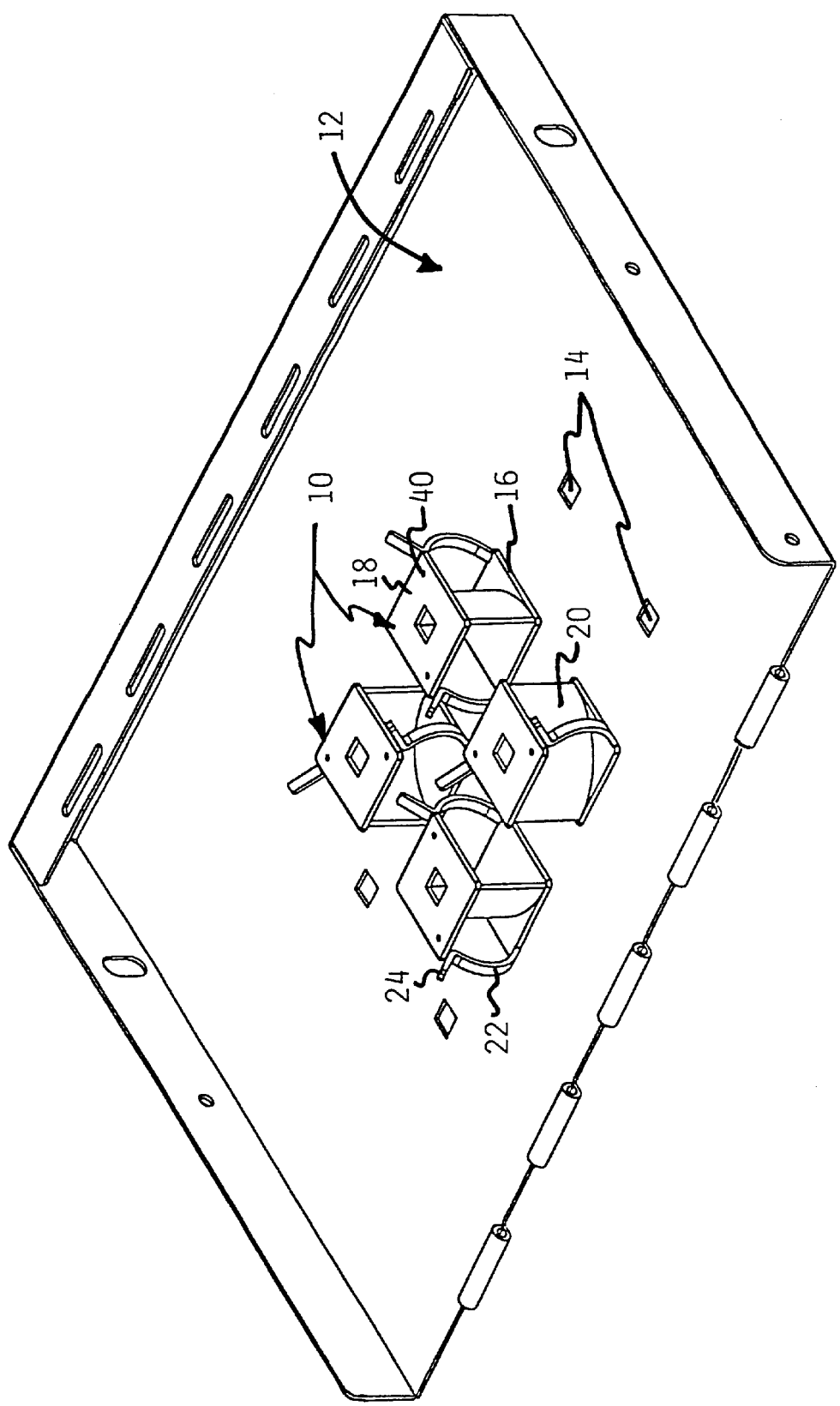
FIG. 1 is a perspective view of a panel upon which are mounted four bend limiting fiber management clips embodying the present invention.
Figure 2:
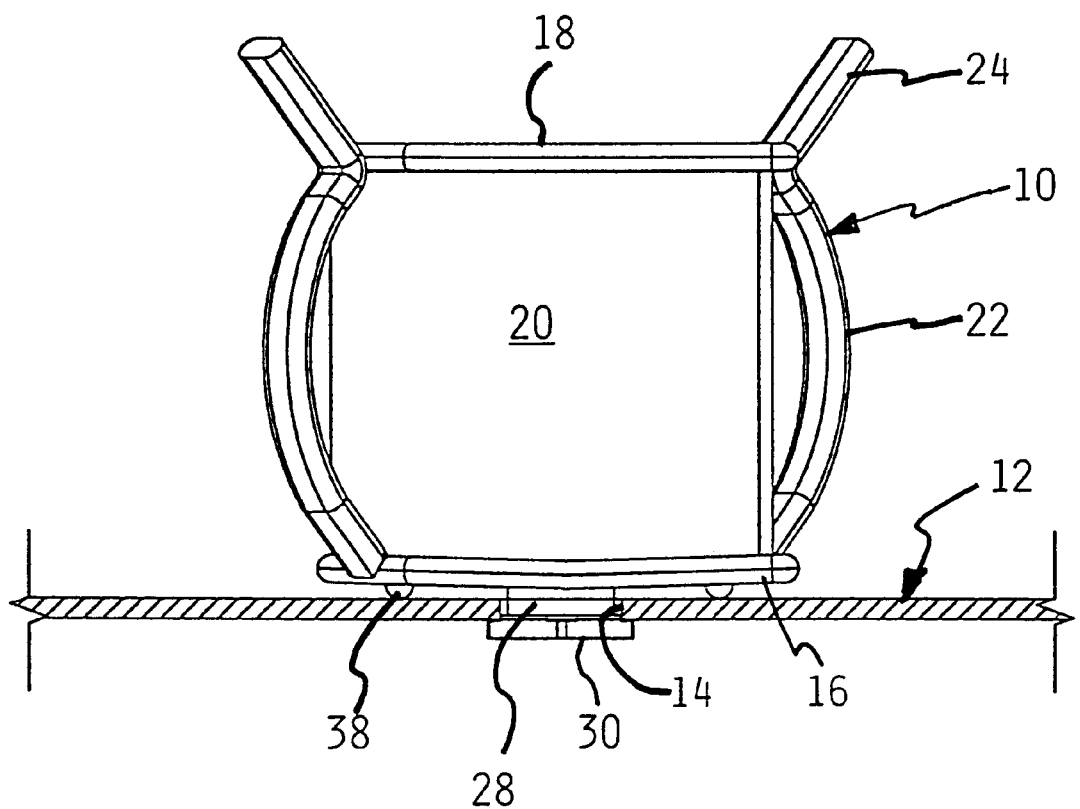
FIG. 2 is a side elevational view of one of the fiber management clips seated on the fragmentarily illustrated panel.

Turning first to FIGS. 1 and 2, therein illustrated is a typical panel generally designated by the numeral 12 upon which are mounted four bend limiting fiber management clips embodying the present invention and generally designated by the numeral 10. The panel 12 has a series of eight rectangular apertures formed therein comprised of two rows of four apertures each, only the outer ones of which are seen.

The fiber bend management clip 10 can be seen to have a generally rectangular bottom wall 16, a generally rectangular top wall 18, and an arcuate pillar 20 extending between the walls 16, 18, and between diagonal corners. At the other two diagonal corners of the clip are deflectable convexly arcuate retainer arms 22 extending upwardly from the bottom wall 16 adjacent the top wall 18 and outwardly extending projections 24 are provided at the upper end thereof. As can be seen, a boss 28 of circular cross section with a rectangular flange 30 about its outer end is provided centrally of the bottom wall 16, and small dimples 38 are provided on the bottom wall 16 adjacent the retainer arms 22 to space the bottom wall 16 outwardly from the surface of the substrate 12.

Figure 5:
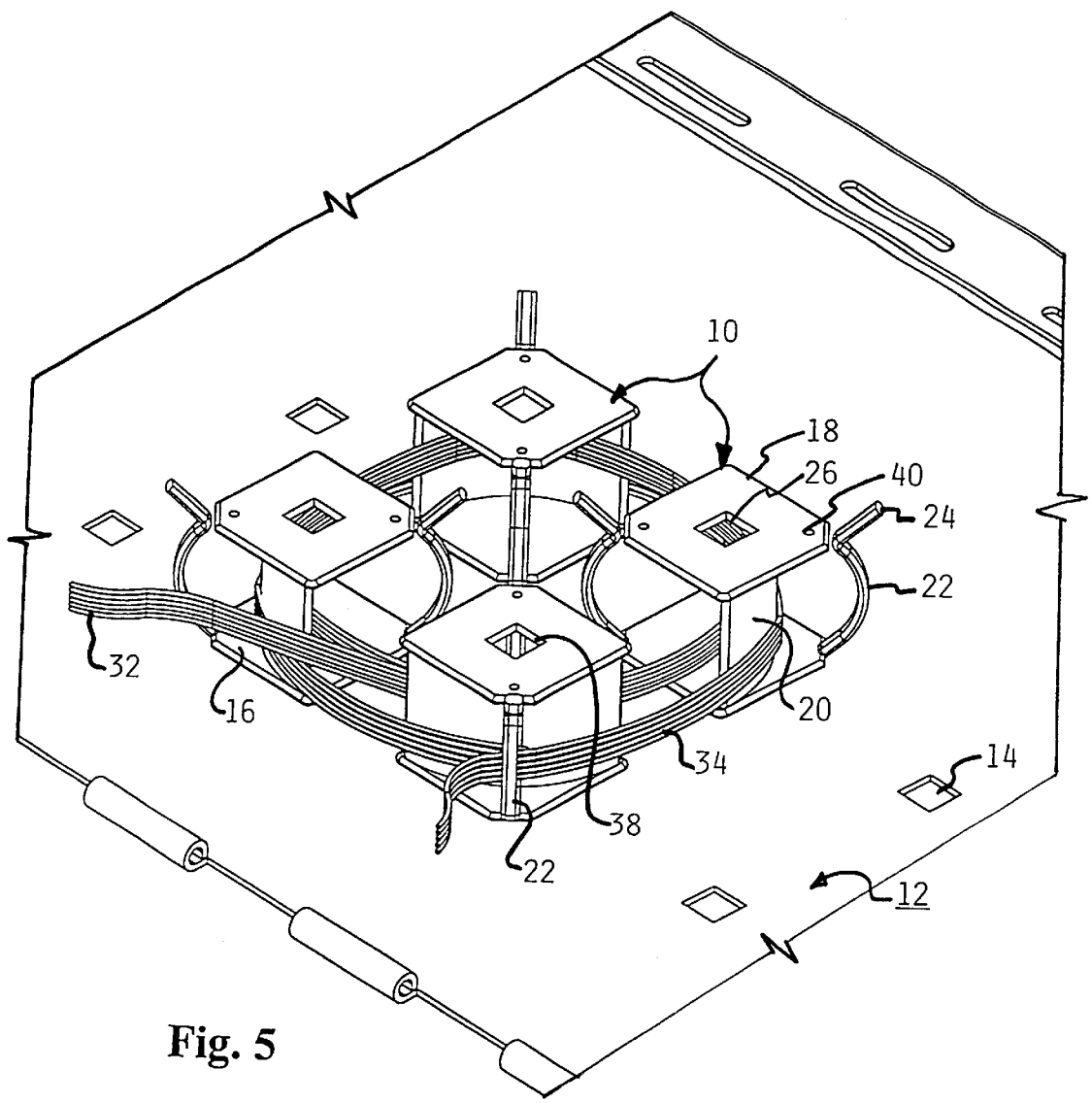
FIG. 5 is an enlarged view of the fiber management clip assembly seen in FIG. 1 with a pair of cables wound thereabout.

The top wall 18 has circular apertures 40 therein adjacent the upper ends of the retainer arms 22, and a rectangular aperture 26 centrally thereof. In FIG. 5, a second tier of clips 10 is mounted upon the first set, the dimples 38 will seat in the apertures 40 in the top wall, and the boss 28 will seat in the aperture 26.

The four fiber management clips 10 have been snapped into four adjacent apertures 14 to define a rectangular array with the arcuate pillars 20 facing towards the corners of the rectangular array so as to define four arcs of a circle. A fragmentarily illustrated first cable 32 has been wound about the inner surfaces of the pillars 20 of this array. A fragmentarily illustrated second cable 34 has been wound about the outer surfaces of the arcuate pillars 20 so that two cables are being coiled in this single array of clips 10.

Figure 6:
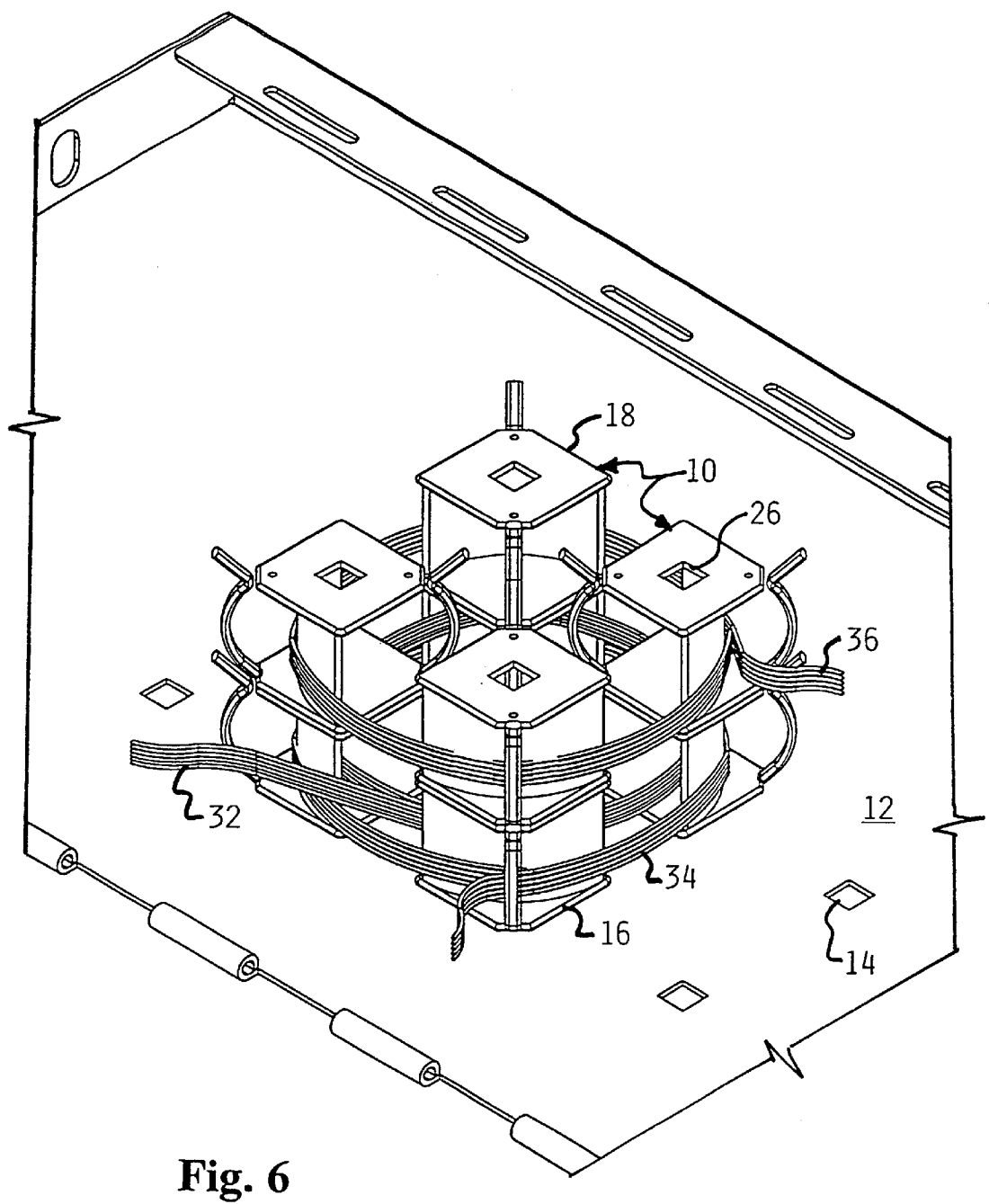
FIG. 6 is a perspective view of a fiber management clip assembly utilizing stacked clips and having three cables wound thereabout.

Turning next to FIG. 6, a second tier of clips 10 has been placed upon the first tier. A fragmentarily illustrated third cable 36 is wound about the outer surfaces of the arcuate pillars 20. If so desired, a fourth cable could be wound about the inner surfaces of the arcuate pillars 20.

As will be appreciated, there is a tendency for the cables 32, 34 to uncoil, and the retainer arms 36 of the fiber management clips of the present invention restrain the tendency to uncoil by the outer cable 34. In the instance of the inner cable 34, the pillars act as stop surfaces.

The illustrated arrangement effectively precludes the winding of the fiber cable so tightly as to cause undue stress and possible fracturing. Moreover, it accomplishes the goal of providing an assembly which coils the desired excess cable length in the cabinet so that it can be neatly managed.

If so desired, the outer apertures 14 and the substrate 12 can be utilized to provide an oval array which will allow still larger lengths of cable to be wound thereabout while still affording control over bending and uncoiling.

The fiber management clips of the present invention can be readily fabricated by injection molding thermoplastic synthetic resin such as nylon 66 to provide a structure which is relatively durable and which possesses the desired deflectability for the retainer arms and for the flange on the boss.

Dimensionally, clips which have proven quite useful have top and bottom walls of a generally square configuration of 1.125 inch on a side, and the distance between the outer surface of the bottom and top walls is about one inch. The boss has a circular body with a diameter of 2.50 inches and the flange is provided by a square portion in the mold to produce a square configuration at the outer or lower end of the boss having the same dimension on a side. This, provides four wings which are points of flexure to facilitate insertion into an aperture of slightly smaller dimension in the support panel.

The dimples which are provided on the lower surface of the bottom wall adjacent the retainer arms serve to provide a biasing pressure relative to the panel in which inserted, as well as provide some centering action when two clips are stacked.

As can be seen, the cable or wire can be easily wound about the outer surfaces of the pillars and any tendency for the cable or wire to uncoil is limited by the retainer arms. Another length of cable is easily coiled inside of the pillars as is also shown in the drawings, and its tendency to uncoil is limited by the pillars. Thus, using a single row of clips will readily enable coiling of two separate cables or wires. Adding a second tier will enable coiling two more. Three or more rows or tiers may be assembled if necessary for the number of cables or wires requiring coiling in the terminating fixture.

Moreover, the clips can be mounted to define four arcs of a circle or of an oval. By providing even more apertures in the panel, the radii of the curvilinear coils can be varied to increase the circumference of the coils.

Thus, it may be seen from the foregoing detailed specification and claims that the limiting fiber management clip of the present invention is one which can be readily and economically fabricated and easily installed in a support panel so as to provide an installation which is adjustable in terms of the total circumference of the coils. Moreover, a single row of clips will allow two separate cables or wires to be quickly coiled so that the excess is easily managed.

Having thus described the invention, what is claimed is:

1. A bend limiting fiber management clip having
   (a) generally rectangular top and bottom walls,
   (b) a pillar extending between said top and bottom walls and arcuately between diagonal corners of said walls,
   (c) convexly arcuate retaining arms extending upwardly from said bottom wall to adjacent said top wall at the other diagonal corners of said walls; and
   (d) a depending boss on said bottom wall engageable in an aperture in a support panel.

2. A bend limiting fiber management clip in accordance with claim 1 wherein said top wall has an aperture cooperatively dimensioned with said boss whereby the boss of a second clip may be engaged in said top wall aperture.

3. A bend limiting fiber management clip in accordance with claim 1 wherein said arcuate retaining arms have projections at the upper ends thereof extending outwardly and upwardly from said top wall.

4. A bend limiting fiber management clip in accordance with claim 1 wherein said arcuate retaining arms are deflectable outwardly from their point of connection to said bottom wall.

5. A bend limiting fiber management clip in accordance with claim 1 wherein said boss is disposed centrally of said bottom wall and has a rectangular flange about its outer end.

6. A bend limiting fiber installation comprising:
   (a) a panel having at least four spaced apertures therein;
   (b) four bend limiting fiber management clips mounted on said panel in a rectangular pattern, each of said clips each having
      (i) generally rectangular top and bottom walls,
      (ii) a pillar extending between said top and bottom walls and arcuately between diagonal corners of said walls,
      (iii) convexly arcuate retaining arms extending upwardly from said bottom wall to adjacent said top wall at the other diagonal corners of said walls; and
      (iv) a depending boss on said bottom wall engaged in one of said apertures of said panel, said arcuate pillars facing diagonally outwardly at the corners of said rectangular pattern to define four arcs of an imaginary closed curve.

7. A bend limiting fiber managing installation in accordance with claim 6 wherein said top wall has an aperture therein cooperatively dimensioned with said boss, the boss of a second clip being engageable in said top wall aperture.

8. A bend limiting fiber installation in accordance with claim 6 wherein said arcuate retaining arms have projections at the upper ends thereof extending outwardly and upwardly from said top wall.

9. A bend limiting fiber installation in accordance with claim 6 wherein said arcuate retaining arms are deflectable outwardly from their point of connection to said bottom wall.

10. A bend limiting fiber installation in accordance with claim 6 wherein said boss is disposed centrally of said bottom wall and has a rectangular flange about its outer end.

11. A bend limiting fiber installation in accordance with claim 7 wherein a second tier of four clips is mounted on said first mentioned four clips.

* * * * *